United States Patent [19]
Morikawa et al.

[11] Patent Number: 5,291,657
[45] Date of Patent: Mar. 8, 1994

[54] SHEARING MACHINE FOR STEEL MATERIAL

[75] Inventors: Sumio Morikawa; Toshiji Ohga; Masahiro Kondoh, all of Osaka, Japan

[73] Assignee: Ohyodo Diesel Co., Ltd., Osaka, Japan

[21] Appl. No.: 115,786

[22] Filed: Sep. 3, 1993

Related U.S. Application Data

[63] Continuation of Ser. No. 988,871, Dec. 10, 1992, abandoned.

[30] Foreign Application Priority Data

Oct. 12, 1992 [JP] Japan .................. 4-272563

[51] Int. Cl.⁵ .................. B23F 3/00; B26B 15/00
[52] U.S. Cl. .................. 30/134; 30/254
[58] Field of Search .................. 30/134, 135, 257, 254, 30/225; 241/101.7

[56] References Cited

U.S. PATENT DOCUMENTS

| | | | |
|---|---|---|---|
| 2,517,471 | 8/1950 | Ewart | 30/257 |
| 3,735,763 | 5/1973 | Shannon et al. | 30/254 X |
| 4,669,187 | 7/1987 | Pardoe | 30/134 |
| 4,897,921 | 2/1990 | Ramun | 30/134 |
| 5,187,868 | 2/1993 | Hall | 30/134 |
| 5,224,268 | 7/1993 | Pemberton | 30/134 |
| 5,230,151 | 7/1993 | Kunzman et al. | 30/134 |

Primary Examiner—Douglas D. Watts
Attorney, Agent, or Firm—Pollock, Vande Sande & Priddy

[57] ABSTRACT

A shearing machine is provided. The machine comprises a lower stationary jaw detachably mounted on one end of an arm of a working machine for rotatable and tiltable movement, the lower stationary jaw having attached thereto a plurality of shearing blades, an upper movable jaw having a plurality of shearing blades adapted to be opened and closed in a scissors-like manner relative to the shearing blades of the lower stationary jaw so as to shear an article to be sheared, and a hydraulic cylinder for pivotally moving the upper movable jaw. The forward-end shearing blade of the lower stationary jaw and the forward-end shearing blade of the upper movable jaw are arranged in a staggered or angled manner relative to their respective adjacent shearing blades of the lower and upper jaws, respectively, so that the forward-end shearing blades of the lower and upper jaws, respectively, may be first engaged with each other, when moved in a vertical direction.

5 Claims, 3 Drawing Sheets

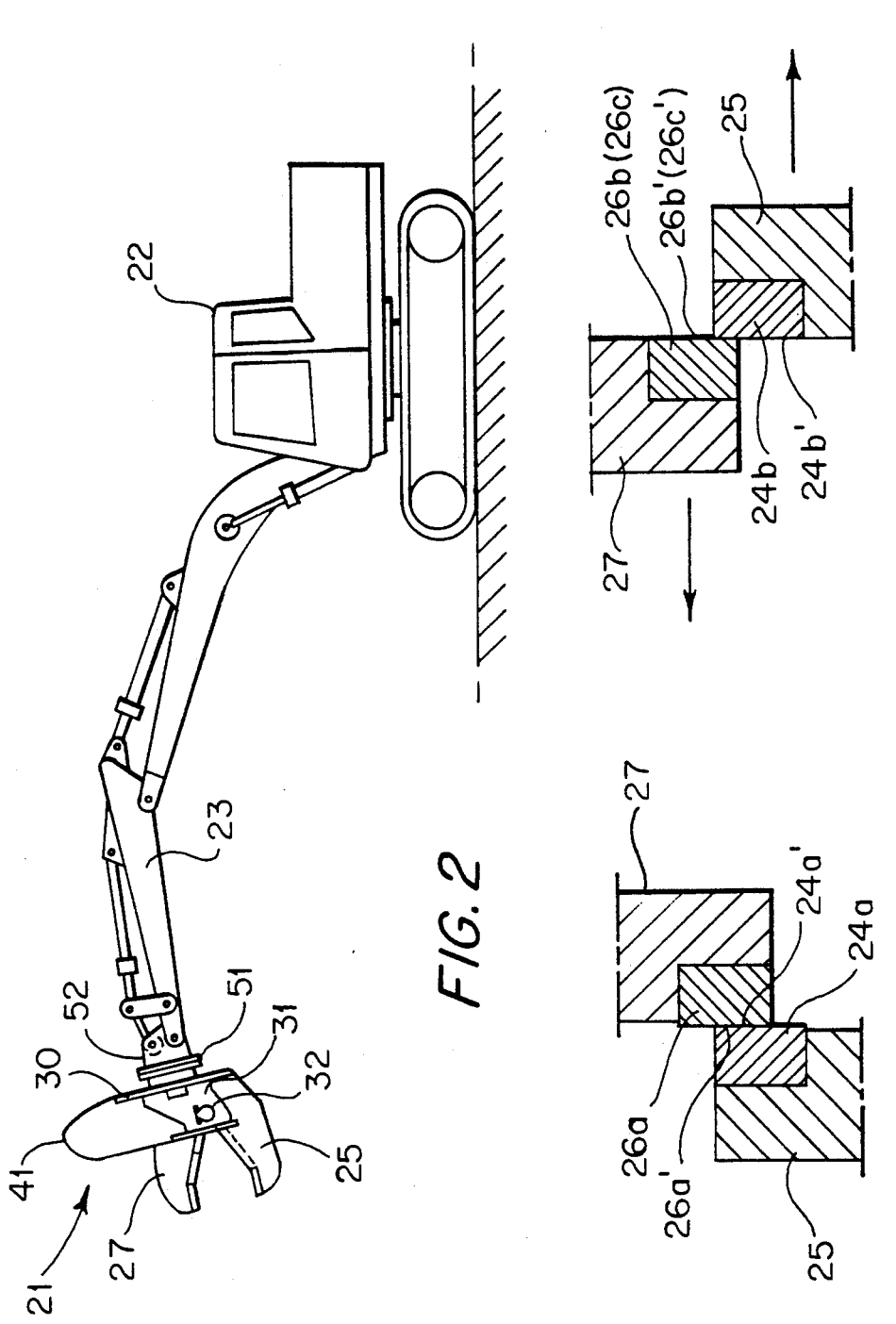

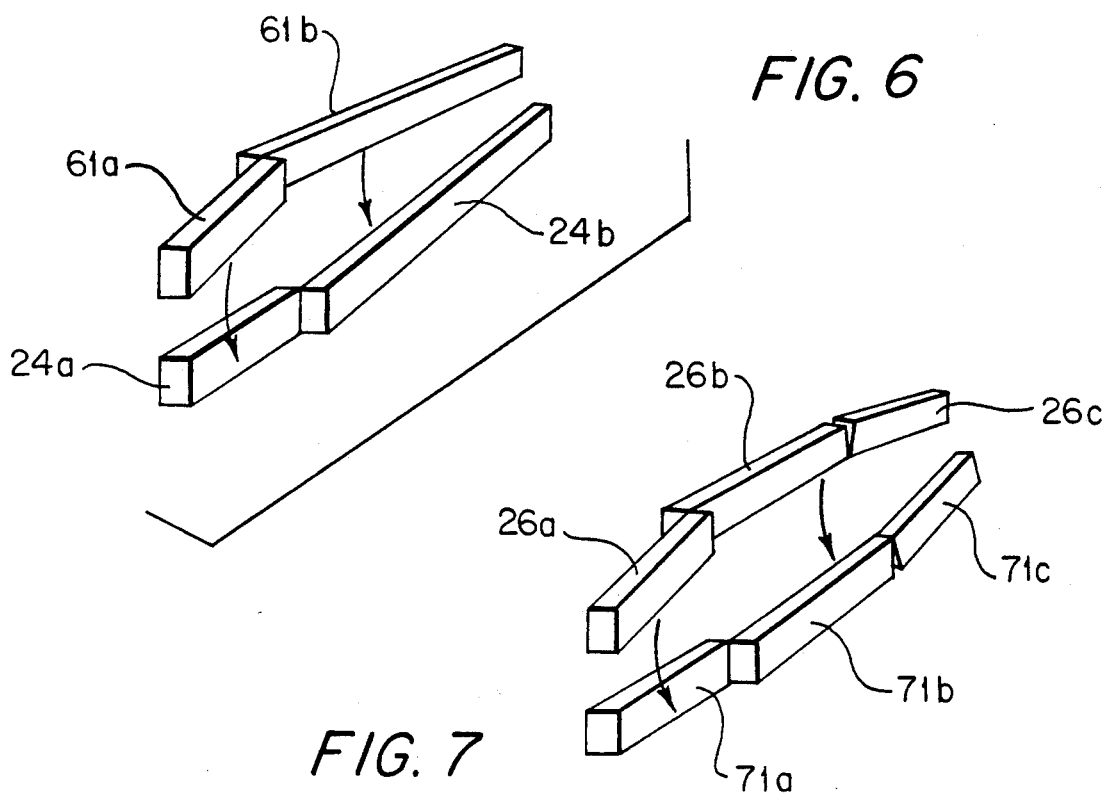
FIG. 6
FIG. 7
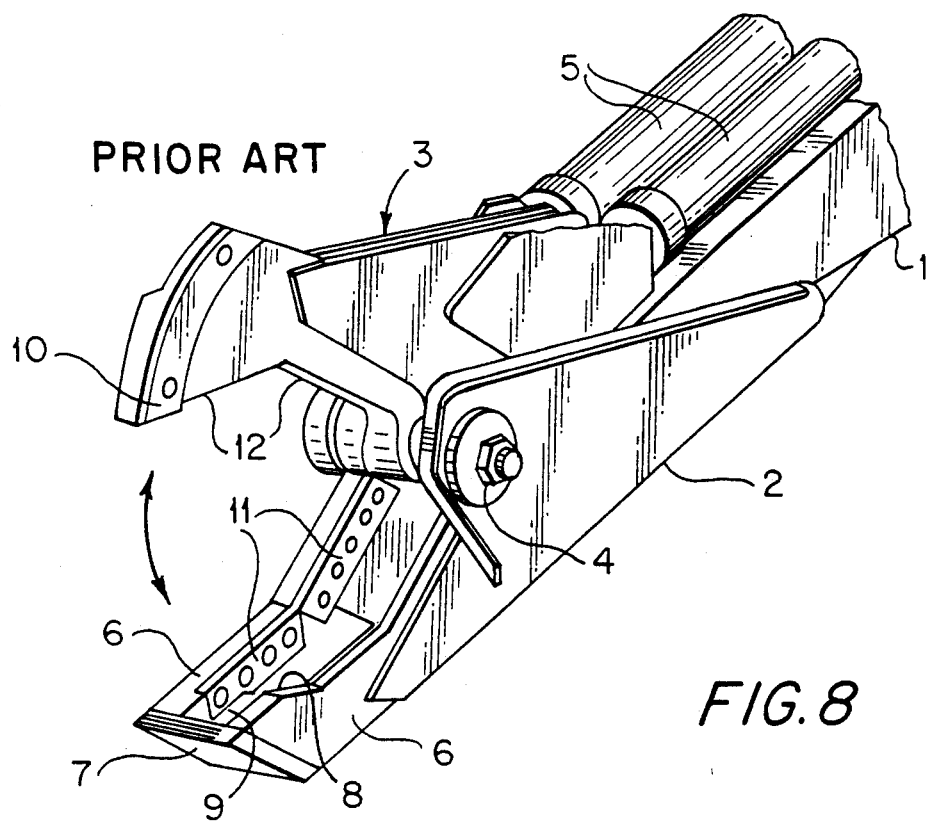
PRIOR ART
FIG. 8

SHEARING MACHINE FOR STEEL MATERIAL

This application is a continuation of Ser. No. 07,988,871 filed on Dec. 10, 1992, now abandoned.

BACKGROUND OF THE INVENTION

1. Field of the Invention

This invention relates to a shearing machine mounted on a tip of an arm of a working machine, such as a power shovel, for shearing various kinds of steel material. 2. Statement of the Prior Art When dismantling or destroying reinforcing bars, buildings of a reinforced concrete construction, scraps of steel, articles or chemical machinery of steel alloy, a steel material shearing machine is usually used, the machine being attached to one end of an arm of a working machine, such as a power shovel. An example of such shearing machines is disclosed in U.S. Pat. No. 4,519,135 and shown in FIG. 8. The shearing machine disclosed in the Patent includes a lower stationary jaw 2 integrally attached to one end of an arm 1 of a power shovel. An upper movable jaw 3 is connected to the lower stationary jaw via a support shaft 4 so that it may be opened and closed vertically in a scissors-like manner. The upper movable jaw 3 may be opened and closed by means of a plurality of hydraulic cylinders 5 mounted on the arm 1. In this manner, the movable jaw 3 is moved relative to the lower stationary jaw so as to shear or cut a steel material clamped therebetween. The lower stationary jaw 2 and upper movable jaw cooperate, in their engaged position, to define a central concave area, so as to prevent a steel material clamped therebetween from slipping off in a forward direction.

The opposite surface of the lower stationary jaw 2 and upper movable jaw 3 cooperate to form a recess 8 defined by side plates 6, 6 and a forward-end connection plate 7. Pressure plates 9 and 10 are disposed at a forward end of a recess 8 in the lower stationary jaw 2 and at a forward end of the upper movable jaw 3, respectively. In this manner, the pressure plate 10 on the upper movable jaw 3, when actuated, is inserted into the recess 8 in the lower stationary jaw 2 and abuts with the pressure plate 9, so as to prevent the upper movable jaw 3 from moving sideways away from the lower stationary jaw. The lower stationary jaw 2 and upper movable jaw 3 include attached thereto a plurality of lower shearing blades 11 and upper shearing blades 12 adapted to be inter-engaged relative to one another.

Another example of such a shearing machine is disclosed in Japanese Patent Publication [KOKOKU] No. 56-49273. Although not shown in the drawings, a shearing machine disclosed in this Publication includes a cylinder case detachably mounted on one end of an arm of a power shovel by means of a rotatable device, and a pair of cutters. Each cutter includes a shearing blade pivotably mounted on a support shaft extending transversely in the cylinder case.

The shearing machine disclosed in the above United States Patent is constructed so that the upper movable jaw 3 may be inserted into the recess 8 formed in the lower stationary jaw 2. Further, each of the upper and lower jaws includes attached thereto a pressure plate 10, 9. This causes such a shearing machine to be relatively large in size, complicated in construction, and significantly heavy in weight, thus making manufacturing cost thereof relatively high. In addition, such a shearing machine requires a relatively large-sized power shovel.

On the other hand, the shearing machine disclosed in the above Japanese Publication is relatively small in size and lightweight. It should be noted, however, that, in such a shearing machine, the cutter body tends to move sideways away from a steel material upon shearing thereof in a direction perpendicular to open close direction of the cutter. Thus, such a shearing machine becomes incapable of securely shearing or cutting a steel material over time of use.

SUMMARY OF THE INVENTION

Accordingly, it is a main object to provide a steel material shearing machine which is constructed, upon shearing of a steel material, to prevent an upper movable jaw from moving sideways away from a lower stationary jaw, so as to securely shear such a steel material.

In order to achieve the above object, the invention provides a steel material shearing machine which comprises a lower stationary jaw detachably mounted on one end of an arm of a working machine for rotatable and tiltable movement, the lower stationary jaw having attached thereto a plurality of shearing blades, an upper movable jaw having a plurality of shearing blades adapted to be opened and closed in a scissors-like manner relative to the shearing blades of the lower stationary jaw so as to shear an article to be sheared, and a hydraulic cylinder for pivotally moving the upper movable jaw. The forward-end shearing blade of the lower stationary jaw and the forward-end shearing blade of the upper movable jaw are symmetrically arranged to the rest of the shearing blades of the jaws with respect to a shearing plane defined by opposite side surfaces of said lower stationary jaw and upper movable jaw.

The lower stationary jaw and upper movable jaw may respectively include an optional number of shearing blades, for example, two or three shearing blades.

When it is intended to shear a steel material, the upper movable jaw is pivoted toward its closed position. By this, first the forward-end shearing blade of the upper movable jaw becomes inter-engaged with the forward-end shearing blade of the lower stationary jaw. Then, the shearing blades of the upper and lower jaws cooperate to shear or cut a steel material clamped therebetween. It will be appreciated that a horizontal component of the shearing force acting on the upper movable jaw is borne or supported by the inter-engaged, forward-end shearing blades of the upper and lower jaws, which prevents the upper movable jaw from moving sideward in a direction perpendicular to the open-close direction of the upper jaw.

BRIEF DESCRIPTION OF THE DRAWINGS

For a better understanding of the invention, and to show how the same may be carried out into effect, reference will be now made, by way of example, to the accompanying drawings in which like reference numerals refer to like elements.

FIG. 2 is a side elevational view of a power shovel incorporating the shearing machine according to the invention.

FIG. 4 is an elevational view, in section, showing an arrangement in which the forward-end of the lower shearing blade and the forward end of the upper shearing blade are engaged with each other.

FIG. 5 is an elevational view, in section, showing an arrangement in which the rearward-end of the lower shearing blade and the rearward-end of the upper shearing blade are engaged with each other.

FIG. 6 is a diagrammatic perspective view illustrating another arrangement of the shearing blades.

FIG. 7 is a diagrammatic perspective view illustrating further arrangement of the shearing blades.

FIG. 8 is a perspective view illustrating prior art steel material shearing blade.

DETAILED DESCRIPTION OF THE PREFERRED EMBODIMENTS

Several embodiments of a steel material shearing machine according to the invention will be explained in detail below with reference to FIGS. 1 through 7.

FIRST EMBODIMENT

Figure 1:
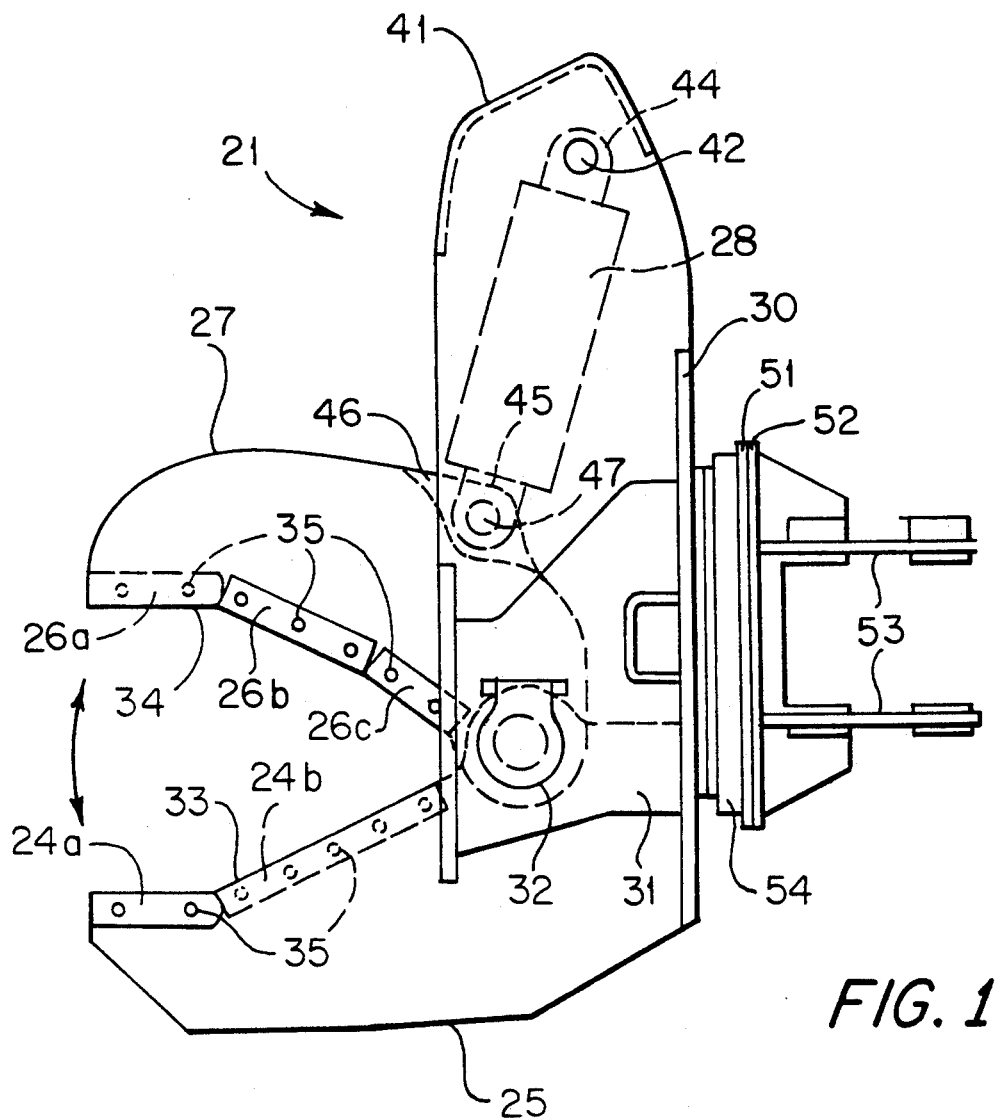
FIG. 1 is a side elevational view illustrated a steel material shearing machine according to the invention.

A steel material shearing machine (referred to simply as "shearing machine" hereinafter) 21 according to a first embodiment of the invention is detachably mounted on a forward end of an arm 23 of a working machine which could be various types of machines, such as a power shovel 22, for rotational and tiltable movement, as shown in FIG. 2. The shearing machine 21 includes, as shown in FIGS. 1 and 2, a lower stationary jaw 25 having two lower shearing blades 24a and 24b, an upper movable jaw 27 having three upper shearing blades 26a, 26b and 26c adapted to be closed in a scissors-like manner relative to the lower shearing blades 24a and 24b of the lower stationary jaw 25 so as to cut a steel material, and a hydraulic cylinder 28 for moving the upper movable jaw 27 in a swingable manner.

The lower stationary jaw 25 is forwardly protruded integrally from a rotational end place 30 and a support frame 31 fixedly connected to the rotational end plate. The upper movable jaw 27 is pivotally connected to the lower stationary jaw 25 at its upper, rearward portion via a pivot shaft 32, so that the upper movable jaw 27 may be closed in a scissors-like manner. Engagement portions 33 and 34 oppositely disposed on the lower stationary jaw 25 and upper movable jaw 27, respectively, cooperate to form a concave configuration. The lower shearing blades 24a and 24b and the upper shearing blades 26a, 26b and 26c are attached to the respective concave engagement portions 33 and 34 by means of a plurality of bolts 35 so that they may be engaged with each other whereby preventing a steel material clamped therebetween from slipping forwardly. Prevention of a steel material from slipping forwardly may be achieved by forming an obtuse abutment angle between the forward shearing blade 24a and the next shearing blade 24b of the lower jaw 25, and between the forward shearing blade 26a and the next shearing blade 26b of the upper jaw 27.

Figure 3:
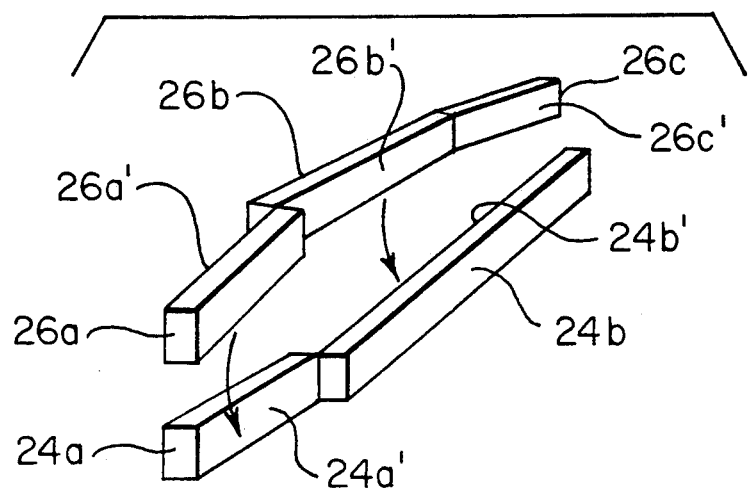
FIG. 3 is a diagrammatic perspective view illustrating arrangement of a lower shearing blade and an upper shearing blade.

The shearing blades 24a and 24b of the lower jaw 25 are arranged so that the forward shearing blade 24a of a shorter length is offset relative to the shearing blade 24b of a longer length along the longitudinal direction, as shown in FIG. 3. The shearing blades 26a, 26b and 26c of the upper jaw 27 each having a relatively short length are arranged so that the forward-end shearing blade 26a a is offset relative to the succeeding shearing blades 26b and 26c along the longitudinal direction, as also shown in FIG. 3. Specifically, the shearing blades of the upper and lower jaws are so arranged that, when the jaws are closed, a side surface 24a' of the forward shearing blade 24a of the lower jaw 25 and a side surface 26a' of the forward-end shearing blade 26a of the upper jaw 27 are slidably inter-engaged, while a side surface 24b' of the rearward shearing blade 24b of the lower jaw 25 and side surfaces 26b' and 26c' of the succeeding shearing blades 26b and 26c of the upper jaw 27 are slidably inter-engaged. Thus, when the shearing blades 24a and 24b of the lower jaw 25 and the shearing blades 26a, 26b and 26c of the upper jaw 27 are inter-engaged, the shearing blades 26a and 24a are firstly engaged with each other at the respective side surfaces 26a' and 24a', so as to prevent the upper movable jaw 27 from moving away from the lower stationary jaw 25 in a direction perpendicular to the open-close direction of the upper jaw 27, by countering on the opposite side surfaces 26a'', 24a''' a component (shown by arrow marks in FIG. 5) of the shearing force generated when the lower shearing blade 24b and upper shearing blades 26b, 26c are inter-engaged.

A cylinder case 41 is integrally attached to the rotatable end plate 30 and the support frame 31, the cylinder case being extended upwardly. A pair of hydraulic cylinders 28 are disposed within the cylinder case 41 in parallel relationship with each other (only one of the cylinders is shown in the drawings). One end or proximal end of each of the hydraulic cylinders 28 is pivotally connected to the upper portion of the cylinder case 41 via an attachment shaft 42. A distal end of a rod 45 of each of the hydraulic cylinders 28 is connected to an attachment piece 46 formed in the upper portion of the upper movable jaw 27 via an attachment pin 47. Thus, reciprocal movement of the rod 45 causes the upper movable jaw 27 to be opened and closed in a scissors-like manner so as to shear or cut a steel material.

A fixation end plate 51 is connected to the rotatable end plate 30. An attachment bracket 52 is fixedly connected to the fixation plate 51. The attachment bracket 52 is provided with two attachment arms 53, 53 protruding from the rearward surface of the attachment bracket 52. The two attachment arms 53, 53 are are pivotally mounted to an arm 23 of a working machine 22.

A bearing 54 having an internal gear is attached to the rotational end plate 30. The fixation end plate 51 houses therein a hydraulic motor having a pinion, or a rotational braking unit having a pinion for freely rotational movement and a swivel joint (none of them are shown in the drawings). Thus, when the internal gear is rotated by means of the pinion directly connected to the hydraulic motor, the rotatable end plate 30 is rotated so as to cause the entire shearing machine 21 to be rotated in the range of 360 degrees relative to the arm 23 of the working machine 22.

Operation of the shearing machine according to the invention will be explained below.

With the upper movable jaw 27 maintained in its open position, the working machine 22 is operated so that a steel material may be clamped between the lower stationary jaw 25 and the upper movable jaw 27. Then, the hydraulic cylinder 28 is actuated to be extended so as to close the upper movable jaw 27. It should be recalled that the shearing blade 24a of the lower jaw 25 and the shearing blade 26a of the upper jaw 27 are maintained at an obtuse angle relative to the adjacent shearing blade 24b of the lower jaw 25 and the adjacent shearing blade 26b of the upper jaw 27, respectively. Accordingly, when the upper movable jaw 27 is actuated to be closed, a steel material, once clamped between the jaws, will be urged by the forward-end shearing blade 24a of the lower jaw 25 and the forward-end shearing blade 26a of the upper jaw 27 inwardly or rearwardly of the lower stationary jaw 25 and upper movable jaw 27. Thus, such a steel material is clamped without slipping forwardly and sheared or cut by the cooperative action of the shearing blades 24a and 24b of the lower jaw 25 and the shearing blades 26a, 26b and 26c of the upper jaw 27.

It should be also recalled that the forward-end shearing blade 26a of the upper jaw 27 and the forward-end shearing blade 24a of the lower jaw 25 are respectively disposed in staggered fashion with respect to the shearing blades 26b and 26c of the upper jaw 27 and the shearing blade 24b of the lower jaw 25. In other words, the blade 26a and the blade 24a are symmetrically arranged relative to the rest of the shearing blade of the jaws with respect to a shearing plane defined by opposite side surfaces of the lower jaw 25 and the upper jaw 27. Thus, first the forward end shearing blade 26a of the upper movable jaw 27 is engaged with the forward-end shearing blade 24a of the lower stationary jaw 25, as shown in FIG. 4, then the rearward shearing blade 24b of the lower stationary jaw 25 and the rearward shearing blades 26b and 26c of the upper movable jaw 27 are inter-engaged with each other, as shown in FIG. 5. As a result, transverse force, to the upper movable jaw 27, which is derived from the shearing force applied to the upper movable jaw 27 upon shearing a steel material will be borne by the opposite side surfaces 24a' and 26a' of the inter-engaged shearing blades 24a and 26a, which prevents the upper movable jaw 27 from moving away from the lower stationary jaw 25 in a direction perpendicular to the open-close direction of the jaws. Accordingly, the shearing blades 24a and 24b of the lower jaw 25 and the shearing blades 26a, 26b and 26c of the upper jaw 27 may cooperate to securely shear or cut a steel material clamped therebetween. After a steel material has been sheared, the hydraulic cylinder 28 is contracted, whereby the upper movable jaw 27 is actuated to be opened to its original or home position.

SECOND EMBODIMENT

FIG. 6 is a diagrammatic perspective view illustrating an alternative arrangement of shearing blades attached to the lower stationary jaw and upper movable jaw. In this embodiment, the upper movable jaw 27 includes mounted thereon a relatively short shearing blade 61a and a relatively long shearing blade 61b. These blades 61a and 61b respectively correspond to the shearing blades 24a and 24b of the lower stationary jaw 25. The forward shearing blade 61a of the upper jaw 27 is disposed in staggered or angled manner relative to the rearward shearing blade 61b. The shearing blade 61a is also arranged so as to be engaged with the forward shearing blade 24a of the lower stationary jaw 25.

THIRD EMBODIMENT

FIG. 7 diagrammatically illustrates a further alternative arrangement of shearing blades attached to the lower stationary jaw and upper movable jaw. In the illustrated embodiment, the lower stationary jaw 25 includes attached thereto three shearing blades 71a, 71b and 71c of a relatively short length. These shearing blades 71a, 71b and 71c respectively correspond to the shearing blades 26a, 26b and 26c of the upper movable jaw 27, such as shown in FIG. 1. The forward-end shearing blade 71a of the lower jaw 25 is arranged in staggered or angled manner relative to the remaining shearing blades 71b and 71c of the lower jaw 25, so that the shearing blade 71a is inter-engaged with the forward-end shearing blade 26a of the upper jaw 27. As a modification of this embodiment, the shearing blades 26b and 26c of the upper jaw 27 and shearing blades 71b and 71c may also be arranged in a staggered or angled manner, so that a horizontal component of the shearing force generated upon shearing a steel material will be born by the shearing blades 26a, 26c and 71a, 71c of the upper and lower jaws 27 and 25, respectively.

In accordance with the invention, the shearing blades of the lower stationary jaw and the shearing blades of the upper movable jaw, which are to be inter-engaged therewith, are arranged so that the forward shearing blade of the lower jaw and forward shearing blade of the upper jaw are symmetrically arranged relative to the rest of the shearing blade of the jaws with respect to a shearing plane defined by opposite side surfaces of the lower jaw and the upper jaw. Accordingly, upon shearing of a steel material, first the forward shearing blade of the upper jaw and forward shearing blade of the lower jaw are inter-engaged with each other. The inter-engagement of the forward shearing blades prevents the upper movable jaw is prevented from moving sideward from the lower stationary jaw, while a steel material is sheared by means of the remaining shearing blades. This contributes to secure shearing of a steel material. It is to be noted that the forward shearing blades of the upper and lower jaws are disposed in a simple staggered or angled manner relative to their respective adjacent shearing blades. This permits a shearing machine to be made simple and light-weight construction. Thus, the invention provides a shearing machine which may be produced easily and inexpensively and which may be rotatably mounted on an end of an arm of a working machine.

The principles, preferred embodiments and modes of operation of the present invention have been described in the foregoing specification. It should be noted, however, that the invention is not limited by such illustrative embodiments. Variations and changes may be made by one having ordinary skill in the art without departing from the spirit of the present invention. Accordingly, the foregoing detailed description should be regarded as exemplary in nature and not limiting the scope and spirit of the invention set forth in the appended Claims.

What is claimed is:

1. A shearing blade configuration for shearing machine jaws comprising: an upper shearing blade assembly including
    (a) a forward blade disposed in a first vertical plane;
    (b) at least one rearward blade having its cutting surface located contiguous with the cutting surface of the forward blade, and disposed in a second vertical plane parallel to the first plane, the blades positioned in laterally stepped relation;
    (c) the forward and rearward blades forming an obtuse angle therebetween; a lower shearing blade assembly including
    (d) a forward blade disposed in a third vertical plane, parallel to the first and second planes;
    (e) at least one rearward blade having its cutting surface located contiguous with the cutting surface of the lower forward blade, and disposed in a fourth vertical plane parallel to the first, second and third planes, the lower blades positioned in laterally stepped relation;

(f) the lower forward and rearward blades forming an obtuse angle therebetween to ensure closure of the forward upper and lower blades before the rearward upper and lower blades;

the forward blades and the rearward blades having corresponding lateral surfaces in contact with one another upon closure of the jaws for interlocking the jaws and preventing their lateral separation.

2. The configuration set forth in claim 1 wherein the upper blade assembly includes two rearward blades located in coplanar relation, their cutting surfaces being adjacent one another.

3. The configuration set forth in claim 1 wherein each of the upper and lower blade assemblies includes one rearward blade.

4. The configuration set forth in claim 1 wherein each of the upper and lower blade assemblies includes two rearward blades located in coplanar relation, their cutting surfaces being adjacent one another.

5. The configuration set forth in claim 1 together with means for selectively rotating the jaws 360°.

* * * * *